Sept. 11, 1923.
E. VAN DER PYL
SHOCK ABSORBER
Filed July 12, 1922
1,467,987
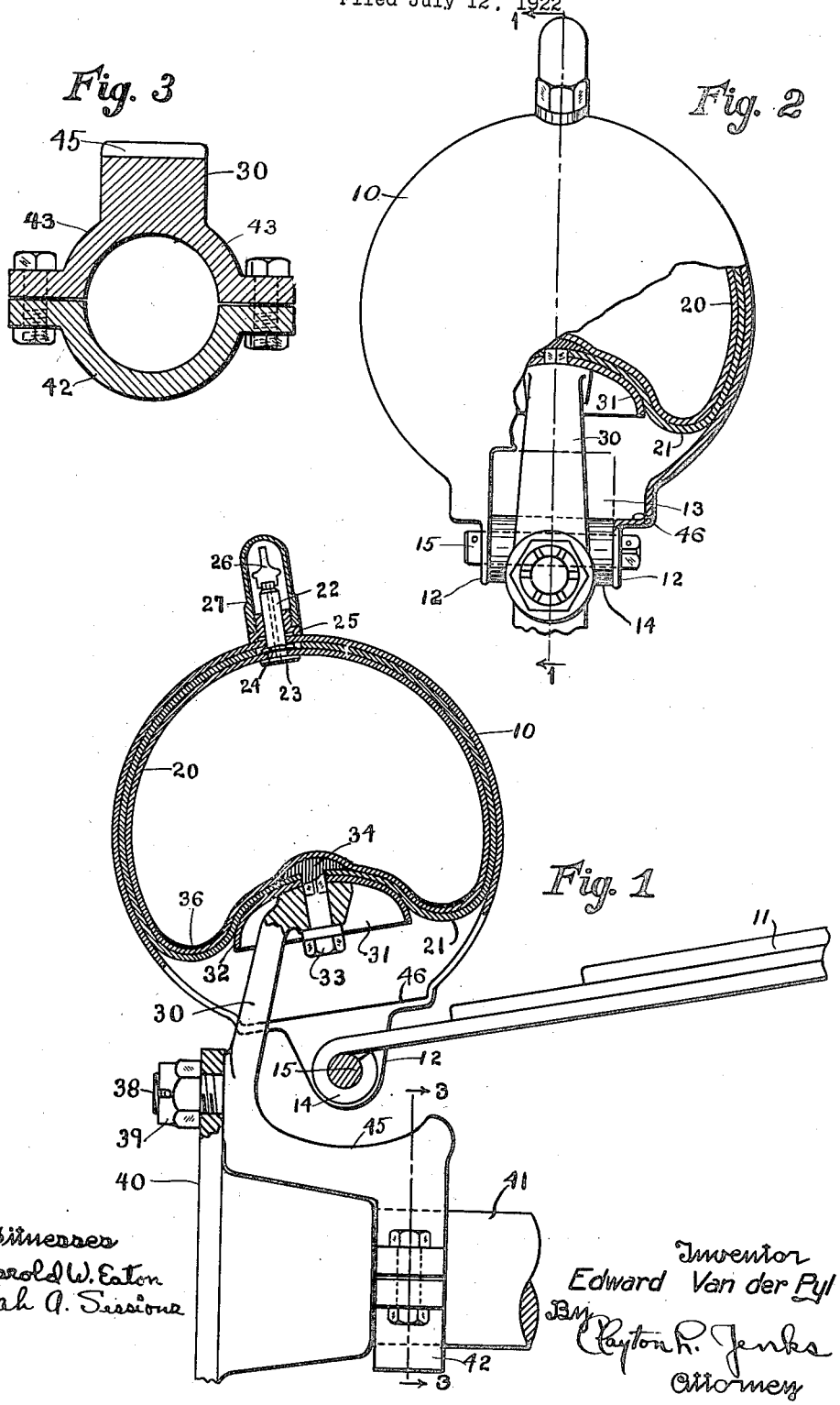

Patented Sept. 11, 1923.

1,467,987

UNITED STATES PATENT OFFICE.

EDWARD VAN DER PYL, OF WORCESTER, MASSACHUSETTS, ASSIGNOR TO AEROBELLE COMPANY, A CORPORATION OF MASSACHUSETTS.

SHOCK ABSORBER.

Application filed July 12, 1922. Serial No. 574,376.

*To all whom it may concern:*

Be it known that I, EDWARD VAN DER PYL, a citizen of the United States of America, residing at Worcester, in the county of Worcester and State of Massachusetts, have invented certain new and useful Improvements in Shock Absorbers, of which the following is a full, clear, and exact specification.

My invention relates to shock absorbers and more particularly to a pneumatic cushioning device for use on motor vehicles.

It has been recognized that an air cushion, such as is provided by a dash pot, absorbs the shocks incident to vehicular travel more completely than do mechanical contrivances employing springs as their main elements. However, a dash pot which comprises a piston reciprocable in a cylinder has been found to have certain objectionable features, due largely to the difficulty involved in keeping the piston air tight; hence this construction has been employed only on the heavier and more expensive cars, in which complicated mechanisms may be used. It has been purposed to employ a flexible air container, like a rubber ball, within the piston casing to obviate the necessity for making the piston fit perfectly within the cylinder. By pumping air into this flexible container to a desired extent, a suitable cushioning action for a given weight of load may be obtained.

The constructions of this type heretofore proposed have however failed to take into account the nature and the directions of the various forces which arise when the vehicle is subjected to severe shocks and strains and is caused to travel over an uneven road at high speed. An effort to give such shock absorbers a universal action has resulted in the provision of complicated mechanisms having numerous joints and wearable parts which soon become loose and vibrate in an objectionable manner.

It is accordingly an object of my invention to provide a simplified and economical construction of the above type which has but few wearable parts and yet will permit universal movement of the suspended vehicular body relative to the running gear, whose parts are easily and quickly assembled and replaced and which will serve as a pneumatic cushion for the lighter vehicles and for variable loads and require but little attention on the part of the operator.

With this and other objects, as will be apparent in the following disclosure, my invention resides in the combination of parts set forth in the specification and covered by the claims appended hereto.

Referring to the drawings, in which like reference numerals indicate like parts:—

Fig. 1 is a sectional view on the line 1—1 of Fig. 2 of my shock absorber as applied to a motor vehicle, partly broken away;

Fig. 2 is an elevation of the shock absorber partly in section; and

Fig. 3 is a sectional view of the clamp taken on the line 3—3 of Fig. 1.

In accordance with my invention, I provide a pneumatic shock absorber for supporting a vehicle body on the running gear in which a piston like member is rigidly mounted on one of the relatively movable vehicle parts and engages a flexible wall of the compressed air container of suitable shape and material, which is pivotally mounted on the other vehicle part, the weight of the car body being yieldingly suspended by the air container serving as a dash pot cylinder from which the air cannot escape.

As one embodiment of my invention, I may pivotally mount on the body of the car a compressed air container of substantially a ball shape which is made of suitable deformable, air impervious material such as rubber. This ball is preferably located in a metal casing of sufficient rigidity and strength to withstand the shocks and stresses of usage and which is designed to protect the flexible material from exposure to the elements. The piston, in this form, consists of a perch rigidly mounted on the running gear and supporting the ball.

Referring specifically to the drawings, I provide a casing 10 of suitable metal and preferably substantially spherical in shape in order to prevent undue stresses on the material of the inclosed air container, although obviously the casing may be otherwise suitably shaped. This casing is pivotally mounted on one of the relatively movable parts of the vehicle, herein illustrated as the vehicle springs 11 which carry the car body. The casing has its lower end open and is provided with ears 12 projecting downwardly on opposite sides of the opening 13. The end of the lower leaf of spring 11 is turned over to form a bearing 14 which is pivotally mounted on the cross bolt 15 carried in holes provided in the ears 12, whereby the casing 10 may have a swinging movement relative to the spring 11. If desired a universal ball and socket or other type of joint may be substituted for the simple form herein illustrated.

The deformable container, adapted to hold air under pressure, in the present embodiment, consists of a two layer ball in which the inner layer 20 may comprise flexible, deformable and resilient air impervious material, such as rubber, and the outer layer 21 be made of a substance which is strong, tough and resistant to pressure, such as leather, although other suitable flexible materials may be substituted therefor as is well understood by those familiar with the construction of pneumatic tires and similar articles.

For the purpose of inflating the ball and getting a desired amount of air pressure therein, I utilize a suitable valve device such as is used on automobile tires. As herein illustrated, this device consists of a metal tube 22 projecting through a hole in the casing 10 which contains the usual valve seat and spring pressed plunger. The tube 22 is suitably fastened to the flexible container as by means of a flange 23 engaging the inner surface of the ball and the washer 24 screw threaded on the tube 22 and adapted to clamp against the outer surface of the leather layer. The tube 22 is also fastened to the metal casing 10 as by means of a collar 25 threaded to the tube and adapted to draw the inner container closely against the casing. Suitable caps 26 and 27 are provided as is customary to aid in retaining air and excluding dust from the device.

In order to provide a piston for this pneumatic device, I employ a perch 30 which is adapted to project through the open end of the casing 10 and engage the central portion of a wall of the flexible air container which is exposed within the casing. The upper end of the perch 30 is formed of suitable shape for this purpose and preferably has considerable area adapted to engage the ball. As herein illustrated, the end of the perch may consist of a disk 31 having its outer edge portion bent downwardly to form a rounded-flaring surface 32 so that for any position of the inflated ball and the disk the flexible material will engage only a smooth and flat or rounded surface. As shown, the disk 31 which of course may be formed integral with the perch 30 is fastened thereto by a bolt and nut 33. The head 34 of this bolt passes through a perforation in the leather layer of the ball and is suitably held in place between the rubber and leather layers as by cement. The flanged disk 31 is made much smaller in diameter than the distance across the ball at the normal position of the disk so that a considerable sidewise movement of the perch may be permitted without forming too sharp a fold at the reentrant curve of the ball or otherwise making it possible to cut or injure the flexible material by squeezing it between the casing 10 and the disk 31. It will also be observed that the air pressure is preferably so gauged as to keep the perch disk 31 normally below a horizontal diameter of the ball and keep that portion of the ball which is being constantly flexed as near flat as possible so that the curve 36 in the ball will not ordinarily be deep or of short radius.

Since the above described method of fastening the perch to the ball permits universal movement of the perch relative to the casing, it is not necessary in this device that the perch be mounted for further flexible movement. I, therefore, fasten the perch 30 rigidly to one vehicle part, herein illustrated as the running gear, and in the form shown I accomplish this by means of a bolt 38 projecting from the perch 30 and fastened by a nut 39 to a suitable part of the axle mounting 40 adjacent the vehicle wheel. The perch may also be clamped to the axle casing 41 by means of a clamping yoke 42 suitably bolted to the arms 43 of the perch which straddle the axle casing.

The perch 30 is also provided with a substantially horizontal surface 45 which is adapted to limit movement of the end of the spring 11 in case the air pressure should be accidentally reduced and permit that side of the car body to drop. It will be readily apparent that this device may be mounted on a car with the air container deflated and the spring bearing 14 resting on the surface 45 after which air may be pumped into the casing until the latter has been raised a desired distance as indicated preferably by marks placed on the perch. Upward motion of the casing relative to the perch is limited by shoulders 46 formed adjacent the ears 12, these parts being so constructed that the disk 31 will strike the shoulders and thereby prevent injury to the flexible material of the air container, if such movement is abnormally great. The surface 45 and shoulders 46 are preferably so located relative to the normal position of the disk 31 that the latter may move substantially equal distances up and down before striking the limiting stops.

In operation of the vehicle the perch 30 may oscillate freely up and down or sideways as required by the contour of the road and the casing 10 will swing about the pivot 15 to adjust itself to the position of the perch 30, the tendency being to centralize the disk 31. It will also be seen that in this particular construction the flexible container is adequately protected from the weather as well as the splash from the wheels. Also if the flexible ball should be injured it may be readily replaced by a new one.

Having thus described my invention, what I claim as new and desire to secure by Letters Patent is:

1. In combination with a vehicle having a body and a running gear, a shock absorber therebetween comprising a deformable air container, an open ended rigid casing therefor, means permitting air to be compressed in the container, a pivotal connection between the casing and said body and a perch rigidly mounted on the running gear and centrally connected at its upper end to said container, said parts being constructed to permit the casing to swing on the perch as a pivot when the vehicle body sways transversely.

2. In combination with a vehicle having a relatively movable body and running gear, a shock absorber therebetween comprising a hollow casing open at one end, a container of flexible air impervious material within the casing, means permitting air to be compressed therein, a pivotal connection between the casing and said body and a perch rigidly mounted on the running gear and projecting through the open end of the casing into contact with the flexible container, said perch serving as the sole support of the casing and permitting the latter to swing as the vehicle body sways transversely.

3. In combination with a vehicle having a body and a running gear, a shock absorber therebetween comprising an air container having a flexible wall, a casing therefor a perch rigidly mounted on the running gear and fastened centrally to said wall, means permitting air to be compressed within the container, a pivotal connection between the casing and said body which permits the casing to swing on said perch, and means to positively limit the relative motion of the perch and casing.

4. In combination with a vehicle having a body and a running gear, a shock absorber therebetween comprising an open ended hollow casing, a pivotal connection between said casing and body, a flexible air container within said casing, means permitting air to be compressed within the container, a perch rigidly mounted on the running gear and projecting through the open end of the casing, means to fasten the perch centrally to the exposed face of the flexible container, said perch supporting the casing solely through the flexible container, and shoulders on said perch and casing arranged relative to said perch for positively limiting the movement therebetween.

5. In combination with a vehicle having a body and running gear, a shock absorber therebetween comprising a perch rigidly mounted on the running gear, a hollow casing opening downwardly, a compressed air container within the casing having a deformable wall adjacent the open end of the casing, said perch projecting through said open end and having an extensive rounded surface supporting and centrally fastened to said wall to permit swinging movement of the casing, an ear on the casing projecting below the upper end of the perch, and a member pivotally connected to said ear which suspends the vehicle body from the casing and below the point of support of the latter.

Signed at Worcester, Massachusetts, this 30th day of June 1922.

EDWARD VAN DER PYL.